UNITED STATES PATENT OFFICE.

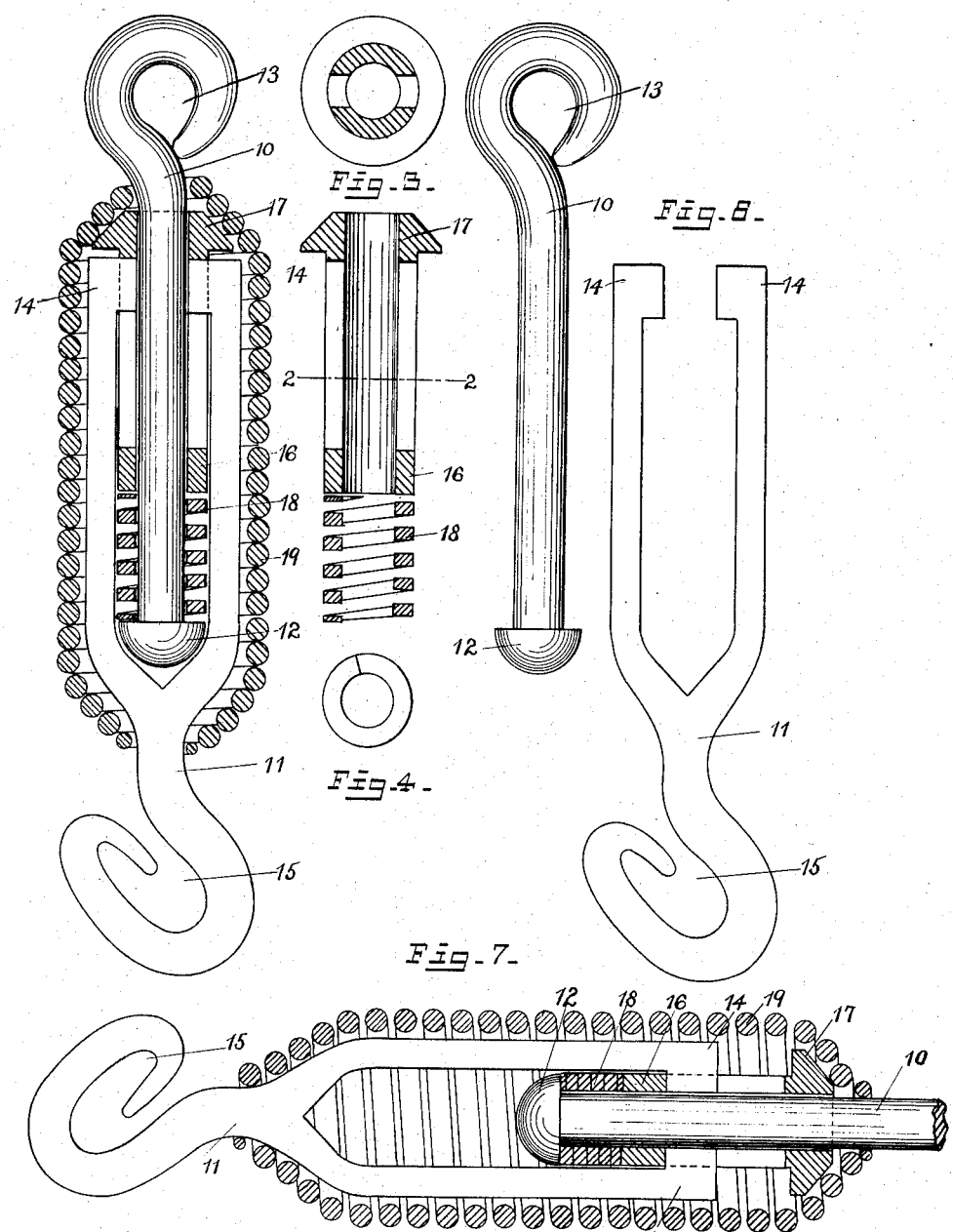

CARL HAINLIN, OF NEW YORK, N. Y., ASSIGNOR, BY DIRECT AND MESNE ASSIGNMENTS, OF ONE-FOURTH TO EUGENE E. VON SEYFRIED, OF NEWARK, NEW JERSEY, AND ONE-FOURTH TO JULIUS DAVIS, OF NEW YORK, N. Y.

SPRING DEVICE.

No. 854,087.      Specification of Letters Patent.      Patented May 21, 1907.

Application filed February 18, 1907. Serial No. 358,045.

To all whom it may concern:

Be it known that I, CARL HAINLIN, a former subject of the Emperor of Germany, having declared my intention to become a citizen of the United States, a resident of New York, borough of Brooklyn, in the county of Kings and State of New York, have invented certain new and useful Improvements in Spring Devices, of which the following is a specification.

My invention relates to spring devices, such as may be used in connection with rolling stock to distribute the strain of resistance offered by the load when it is started or obstructed, for example: as a connection between the whiffle-tree and trace to graduate the strain due to the load, whereby damage to the harness and horse is considerably lessened.

The object of my invention is a device of this character which is simple in construction, compact and strong, and such that it yields under a slight pull to a predetermined extent, after which a greater pull is required, the total possible range of the spring actions being predetermined.

For this purpose my invention consists essentially of two bolts, the one about the other; two concentric springs about the respective bolts; and means to limit the actions of said springs.

The nature of my invention will be best understood in connection with the accompanying drawings in which—

Figure 1 is an elevation, partly in section, of my improved spring device. Figs. 2, 3, and 4 are views of the slotted tube and spring. Fig. 5 is an elevation of the headed bolt. Fig. 6 is an elevation of the forked bolt. Fig. 7 is an elevation, partly in section, showing the spring device under maximum extension.

Similar characters of reference indicate corresponding parts throughout the several views.

Referring to the drawings, 10 and 11 are bolts adapted to be connected to take up opposite stresses.

The bolt 10 is shown as round and provided with the head 12 and eye 13 for outside connection, as for example to a whiffle-tree. The bolt 11 is shown with forked ends having stops or shoulders 14, and is provided with a hook 15 for outside connection, as for example to a trace.

About the headed bolt 10 and within the arms of the forked bolt 11 is a slotted tube 16, the stops 14 being sprung into said slots and arranged to engage therewith. The upper end of this tube is provided with the head 17. Between the lower end of said tube and the head 12 of bolt 10 is held a flat spiral spring 18 coiled about the said bolt 10. Around the forked bolt 11 is wound a round helical spring 19 which incases all the parts, the eye 13 of bolt 10 and the hook 15 of bolt 11 projecting, as shown. Under normal conditions the relative position of the various parts are as shown in Fig. 1. The spring 18 is relatively weak, while the spring 19 is made strong. the relative strengths of these springs being proportioned to the use to which they are intended. As a pull is put upon the spring device, spring 18 is compressed against the lower edge of tube 16 through the drawing up of head 12 of bolt 10. This spring will remain in action until it is entirely closed as shown in Fig. 7. The extent of this compression is predetermined and arranged to suit the use to which the spring is put. After spring 18 has closed the tube 16 and said spring act virtually as one piece, and upon further pull upon the bolts, spring 19 extends, the head 17 acting against spring 19. This extension will continue with increased pull until the stops 14 act against the bottom of the slots of said tube 16, as shown in Fig. 7. This is the limit of the spring action and further pull upon the bolts is carried by the said bolts only, the two bolts acting virtually as one, and without any spring action.

Although I have mentioned this device as applied only in connection with the whiffle-tree and trace, it is evident that it may be applied to many other useful purposes. It may serve even as a spring balance, in which a relatively large movement is obtained for slight pulls, on a spring balance designed to also measure heavy pulls.

I claim:

In a spring device: a headed bolt; a slotted tube about said bolt and provided with a head; a spring about said bolt and interposed between said slotted tube and the head of said bolt; a forked bolt about said headed bolt, having stops engaging the slots of said tube; and a helical spring about said bolts and spring, concentric therewith and inclosing said bolts and spring.

Signed at New York, in the county of New York, and State of New York, this 16th day of February, 1907.

CARL HAINLIN.

Witnesses:
E. E. VON SEYFRIED,
FREDK. F. SCHUETZ.